(12) United States Patent
Kim et al.

(10) Patent No.: US 8,968,908 B2
(45) Date of Patent: Mar. 3, 2015

(54) RECHARGEABLE BATTERY

(75) Inventors: Yong-Sam Kim, Yongin-si (KR); Byung-Kyu Ahn, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 187 days.

(21) Appl. No.: 13/080,388

(22) Filed: Apr. 5, 2011

(65) Prior Publication Data

US 2012/0021274 A1   Jan. 26, 2012

(30) Foreign Application Priority Data

Jul. 23, 2010   (KR) .................. 10-2010-0071645

(51) Int. Cl.
  *H01M 4/34*   (2006.01)
  *H01M 2/26*   (2006.01)
  *H01M 2/34*   (2006.01)
  *H01M 10/04*   (2006.01)
  *H01M 10/0587*   (2010.01)
  *H01M 10/42*   (2006.01)

(52) U.S. Cl.
  CPC ............... *H01M 2/263* (2013.01); *H01M 2/34* (2013.01); *H01M 2/345* (2013.01); *H01M 2/347* (2013.01); *H01M 10/0431* (2013.01); *H01M 10/0587* (2013.01); *H01M 10/4235* (2013.01)
  USPC ............................. 429/144; 429/129; 429/142

(58) Field of Classification Search
  None
  See application file for complete search history.

(56) References Cited

U.S. PATENT DOCUMENTS

| 5,989,743 | A | 11/1999 | Yamashita |
| 2002/0034685 | A1* | 3/2002 | Sato et al. ............ 429/176 |
| 2002/0125860 | A1 | 9/2002 | Schworm et al. |
| 2008/0182161 | A1 | 7/2008 | Prange |
| 2009/0092889 | A1 | 4/2009 | Hwang et al. |
| 2009/0208835 | A1* | 8/2009 | Horiuchi et al. ......... 429/156 |
| 2010/0159315 | A1 | 6/2010 | Imasaka et al. |

FOREIGN PATENT DOCUMENTS

| EP | 1 195 822 A2 | 4/2002 |
| EP | 2 197 070 A1 | 6/2010 |

(Continued)

OTHER PUBLICATIONS

Extended European Search report, dated Nov. 2, 2011, for Application No. EP 11 17 3004, noting the relevant references cited herein, 7 pages.

(Continued)

*Primary Examiner* — Ula C. Ruddock
*Assistant Examiner* — Scott J Chmielecki
(74) *Attorney, Agent, or Firm* — Christie, Parker & Hale, LLP

(57) ABSTRACT

A rechargeable battery includes a plurality of electrode assemblies each having a first planar surface and a second planar surface substantially opposite to the first planar surface; a case housing the electrode assemblies; and a safety member having a first side plate that contacts the first planar surface of a first electrode assembly of the plurality of electrode assemblies, wherein the first electrode assembly is located at a periphery of the electrode assemblies, a second side plate that contacts the second planar surface of the first electrode assembly, and a connector electrically connecting the first side plate and the second side plate to each other, wherein the safety member is electrically coupled to the first electrode.

14 Claims, 10 Drawing Sheets

(56) References Cited

FOREIGN PATENT DOCUMENTS

| EP | 2 293 366 A1 | 3/2011 |
|---|---|---|
| EP | 2 293 367 A1 | 3/2011 |
| JP | 08-153542 | 6/1996 |
| JP | 2002-151159 | 5/2002 |
| JP | 2009-087600 | 4/2009 |
| JP | 2009-094068 | 4/2009 |
| JP | 2011-049147 | 3/2011 |
| JP | 2011-049148 | 3/2011 |
| KR | 10-2007-0110566 A | 11/2007 |
| KR | 10-2008-0005621 A | 1/2008 |
| KR | 10-0905390 B1 | 6/2009 |

OTHER PUBLICATIONS

KIPO Office action dated Oct. 28, 2011, for Korean priority Patent application 10-2010-0071645, 3 pages.

KIPO NOA corresponds to Korean Application No. 10-2010-0071645 a dated May 19, 2012, 5 pages.

SIPO Office action dated Aug. 26, 2013, with English translation, for corresponding Chinese Patent application 201110169172.8, (17 pages).

Korean Patent Abstracts of Korean Publication 10-2008-0019311 dated Mar. 4, 2008, corresponding to Korean Patent 10-0905390 listed above, (2 pages).

* cited by examiner

RECHARGEABLE BATTERY

CROSS-REFERENCE TO RELATED APPLICATION

This application claims priority to and the benefit of Korean Patent Application No. 10-2010-0071645 filed in the Korean Intellectual Property Office on Jul. 23, 2010, the entire contents of which are incorporated herein by reference.

BACKGROUND

1. Field

Embodiments of the present invention relate to a rechargeable battery.

2. Description of the Related Art

Rechargeable batteries can be charged and discharged unlike primary batteries which cannot be recharged. Low-capacity rechargeable batteries are used for portable compact electronic apparatuses such as mobile phones or notebook computers and camcorders and high-capacity rechargeable batteries are widely used as a power source for driving a motor of a hybrid vehicle, etc. or high-capacity storage devices.

Recently, a high-output rechargeable battery using a non-aqueous electrolyte having high energy density has been developed. The high-output rechargeable battery is configured with a high-capacity battery module by connecting a plurality of rechargeable batteries in series to be used for driving a motor for an apparatus requiring a large amount of power, e.g., an electric vehicle, etc. The rechargeable battery may have a cylindrical shape, an prismatic shape, and the like.

When a conductive foreign material such as a nail, a screw, or the like penetrates into the rechargeable battery from the outside of the rechargeable battery, a short-circuit may occur inside of the rechargeable battery. When the short-circuit occurs, the internal temperature of the rechargeable battery rapidly increases to cause a risk that the rechargeable battery will be fired or exploded.

The above information disclosed in this Background section is only for enhancement of understanding of the background of the invention and therefore it may contain information that does not form the prior art that is already known in this country to a person of ordinary skill in the art.

SUMMARY

The described technology has been made in an effort to provide a rechargeable battery having improved safety.

An exemplary embodiment of the present invention provides a rechargeable battery including a plurality of electrode assemblies each having a first planar surface and a second planar surface substantially opposite to the first planar surface; a case housing the electrode assemblies; and a safety member comprising a first side plate that contacts the first planar surface of a first electrode assembly of the plurality of electrode assemblies, wherein the first electrode assembly is located at a periphery of the electrode assemblies, a second side plate that contacts the second planar surface of the first electrode assembly, and a connector electrically connecting the first side plate and the second side plate to each other, wherein the safety member is electrically coupled to the first electrode.

In one embodiment, the connector is generally U-shaped to have opposing surfaces. Further, each of the electrode assemblies may include a first electrode having an uncoated area on which a current collector is exposed and wherein the connector is welded to the uncoated area and a second electrode, wherein the case is electrically coupled to the second electrode.

In one embodiment, the rechargeable battery includes a cap plate coupled to the case, an electrode terminal protruding outwardly from the cap plate and being electrically coupled to the second electrode, and a connection member located on the electrode terminal and contacting the cap plate. The first side plate and the second side plate may have an insulation film thereon. Additionally, in one embodiment, the safety member engages two electrode assemblies of the plurality of electrode assemblies, each of the two electrode assemblies being located at a periphery of the plurality of electrode assemblies. Further, each of the two electrode assemblies that the safety member engages may be located adjacent to an electrode assembly that the safety member does not engage.

According to the exemplary embodiment of the present invention, when a conductive foreign material penetrates from the outside, the safety of a rechargeable battery is improved by preventing the firing and explosion due to internal short-circuit.

DETAILED DESCRIPTION

Figure 1:
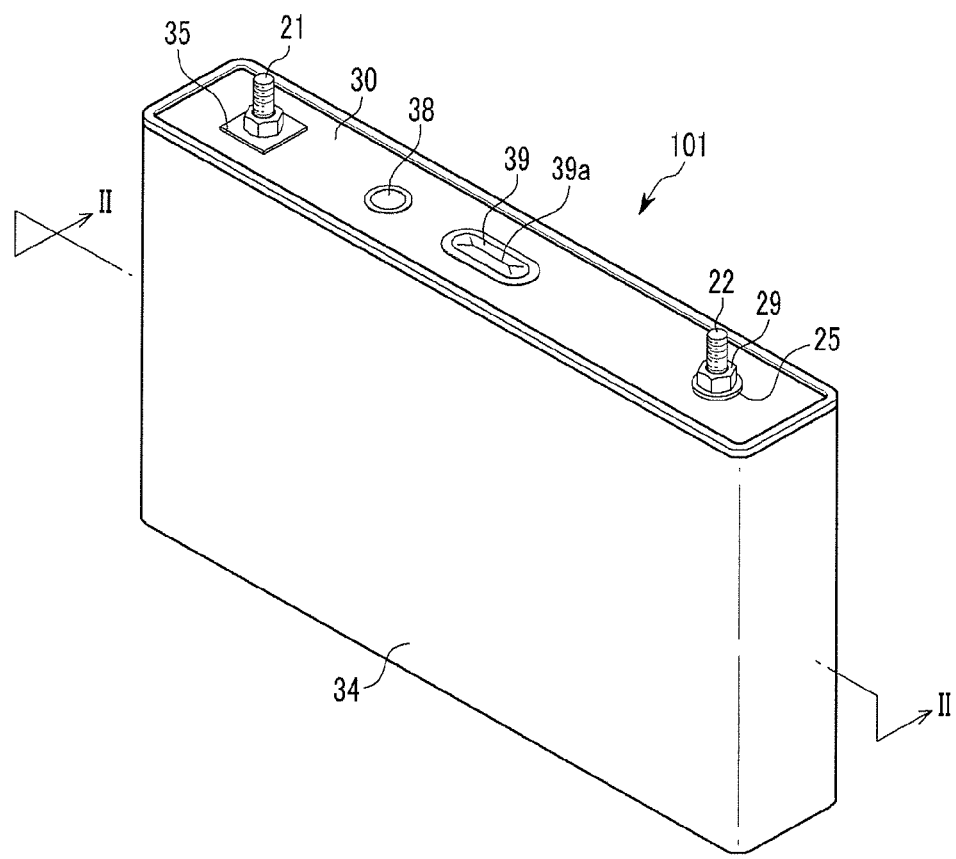
FIG. 1 is a perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In addition, like reference numerals denote like elements in the specification and the accompanying drawings.

Figure 2:
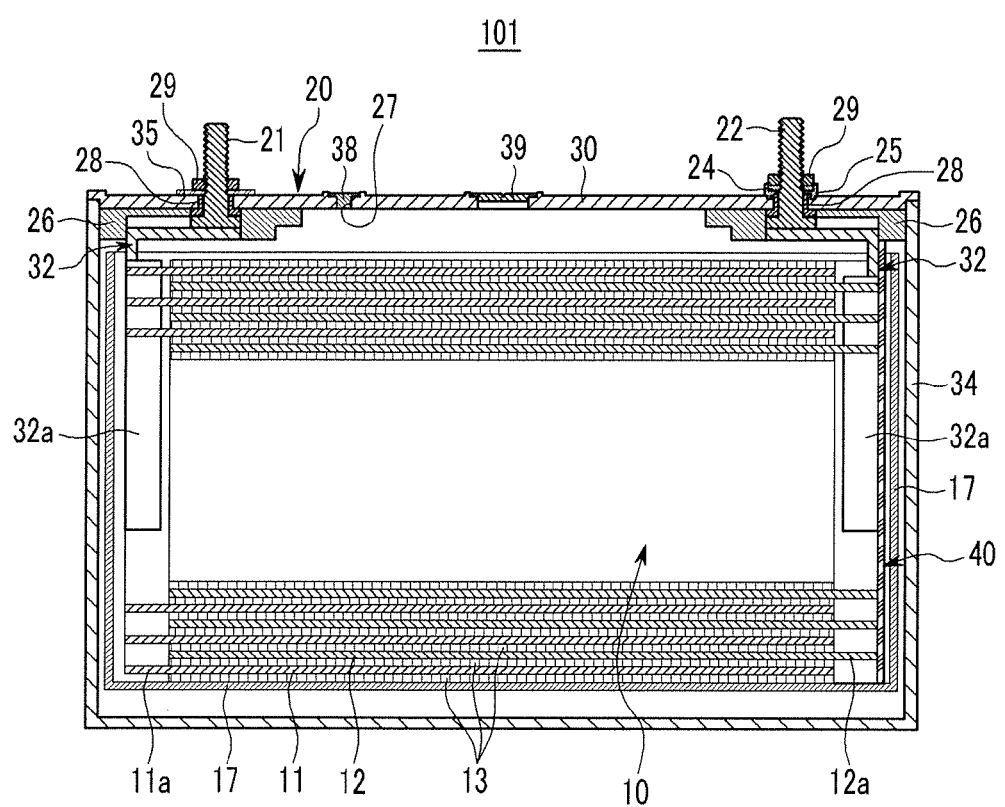
FIG. 2 is a cross-sectional view taken along line II-II of FIG. 1.

FIG. 1 is a perspective view of a rechargeable battery according to a first exemplary embodiment of the present invention. FIG. 2 is a cross-sectional view taken along line II-II of FIG. 1.

Referring to FIGS. 1 and 2, the rechargeable battery 100 according to the first exemplary embodiment includes a plurality of electrode assemblies which are each wound with a separator 13 interposed between a positive electrode 11 and a negative electrode 12, a case 34 in which the electrode assemblies 10 are incorporated, and a cap assembly 20 coupled to an opening of the case 34.

The rechargeable battery 100 according to the first exemplary embodiment is a lithium ion rechargeable battery which has an prismatic shape and will be described as an example. However, the present invention is not limited thereto and the present invention may be applied to various types of batteries such as a lithium polymer battery, or the like.

The positive electrode 11 and the negative electrode 12 include a coated area where a current collector formed of a thin metal foil is coated with an active material and uncoated areas 11a and 12a where the current collector is not coated with the active material. Herein, the positive electrode 11 is a second electrode connected with the case and the negative electrode 12 is a first electrode connected with the safety member 40. However, the present invention is not limited thereto and the positive electrode 11 may become the first electrode and the negative electrode 12 may become the second electrode.

In the exemplary embodiment, four electrode assemblies 10 are installed in the case 34, but the present invention is not limited thereto and any number of electrode assemblies may be installed in the case.

The positive uncoated area 11a is formed on one side end of the positive electrode 11 in a length direction of the positive electrode 11 and the negative uncoated area 12a is formed on the other side end of the negative electrode 12 in a length direction of the negative electrode 12. In addition, the positive electrode 11 and the negative electrode 12 are wound with the separator 13, which is an insulator, located therebetween. Further, a finishing tape supporting the shape of the electrode assembly 10 may be installed on an outer surface of the electrode assembly 10.

However, the present invention is not limited thereto and the electrode assembly 10 may have a structure in which the positive electrode and the negative electrode which are formed by a plurality of sheets that are alternately laminated with the separator located between each sheet.

The case 34 is formed by a substantially rectangular parallelepiped and has an open end. An insulating encapsulation 17 for insulation is installed between the case 34 and the electrode assemblies 10. The insulating encapsulation 17 is a film shape and the top of the insulating encapsulation 17 is open.

The cap assembly 20 includes a cap plate 30 covering the opening of the case 34, a positive terminal 21 which protrudes outwardly from the cap plate 30 and is electrically connected with the positive electrode 11, a negative terminal 22 which protrudes outwardly from the cap plate and is electrically connected with the negative electrode, and a vent member 39 with a notch 39a configured to fracture at a set internal pressure. Herein, the positive terminal 21 is a second electrode terminal connected with a second electrode and the negative terminal 22 is a first electrode terminal connected with a first electrode.

The cap plate 30 is formed by a thin sheet and an electrolyte injection hole 27 for injecting an electrolyte is formed at one side and a sealing plug 38 is installed in the electrolyte injection hole 27.

A lower gasket 25 is installed between the cap plate 30 and the terminals 21 and 22 to seal the space between the cap plate 30 and the terminals 21 and 22. In this disclosure, the terminals 21 and 22 include the positive terminal 21 and the negative terminal 22.

The lower gasket 28 fits in a terminal hole and is adjacent the bottom (i.e., the interior-facing surface) of the cap plate 30. The terminals 21 and 22 have a cylindrical shape. Nuts 29 supporting the terminals 21 and 22 on the top are installed at the terminals 21 and 22 and threads are formed on the outer peripheries of the terminals so that the nuts 29 are fastened to the outer peripheries of the terminals 21 and 22.

A connection plate 35 is inserted onto the positive terminals 21. Therefore, the connection plate 35 is installed between the nut 29 and the cap plate 30. The connection plate 35 serves to electrically connect the positive terminal 21 with the cap plate 30. As a result, the cap plate 30 and the case 34 are electrically connected with the positive electrode 21.

An upper gasket 25 is installed into the negative terminal 22. Therefore, the upper gasket 25 is located on the lower gasket 28 to contact the top of the cap plate 30. The upper gasket 25 serves to insulate the negative terminal 22 and the cap plate 30 from each other. A washer 24 buffering the fastening force between the nut 29 and the upper gasket 25 is installed on the upper gasket 25. Terminal flanges 21a and 22a supporting the terminals from beneath are formed on the bottom of the terminals 21 and 22.

A lower insulation member 26 for insulation is installed between the terminal flanges 21a and 22a and the cap plate 30 and the terminals 21 and 22 are inserted into the lower insulation member 26. A current collecting member 32 electrically connected with the positive electrode 11 or the negative electrode 12 is attached to the terminal flanges 21a and 22a by welding and the terminal flanges 21a and 22a and the current collecting member 32 fit in a groove which is formed on the bottom of the lower insulation member 26. The current collecting member 32 is equipped with a plurality of tabs 32a which protrude downward. In one embodiment, the plurality of tabs 32a are attached to the uncoated areas 11a and 12a of each electrode assembly 10 by welding.

A safety member 40 which is electrically connected to the negative electrode 12 is installed in the electrode assembly 10 which is located at both side ends of the electrode assemblies 10.

Figure 3:
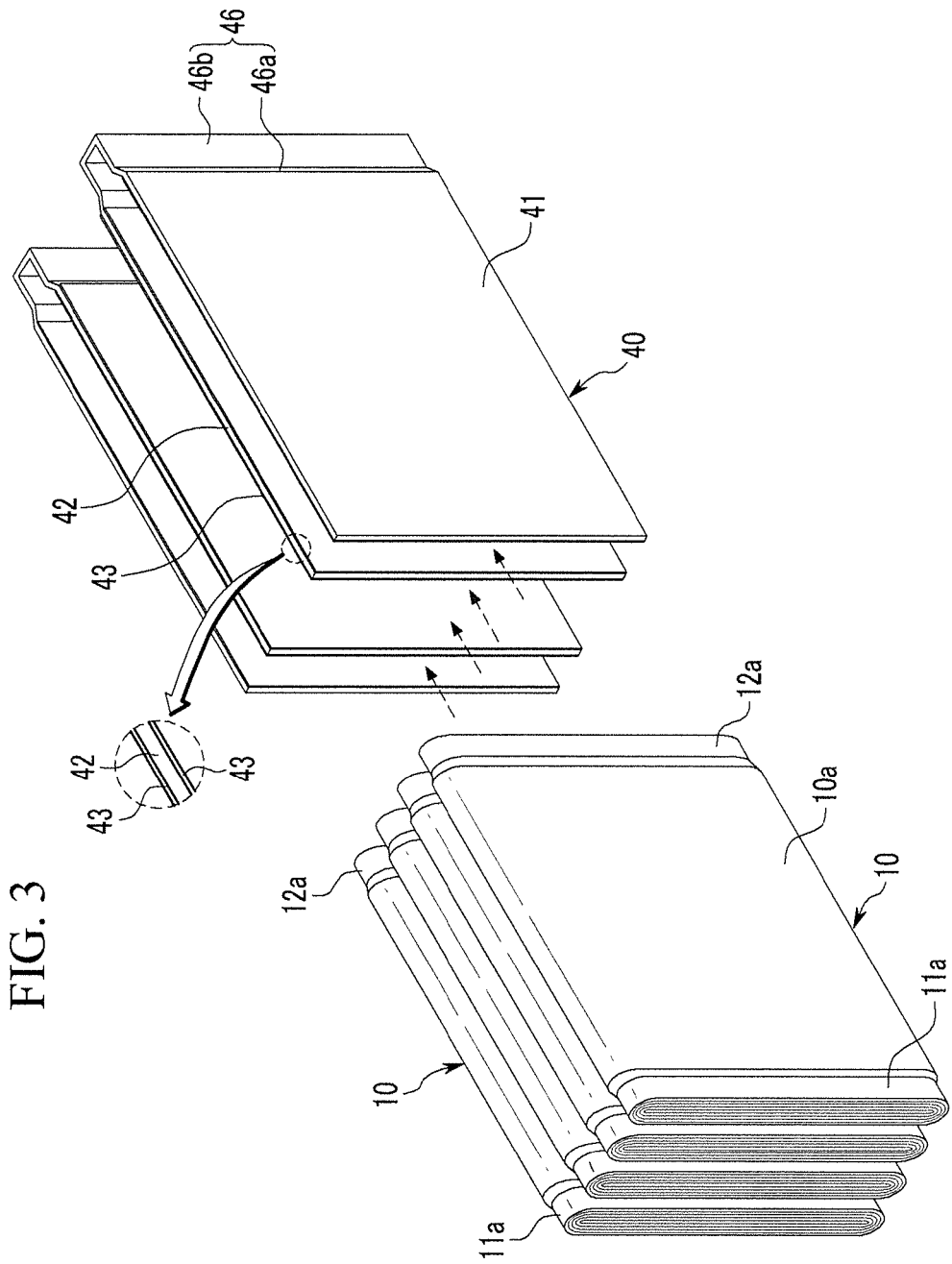
FIG. 3 is an exploded perspective view of an electrode assembly and a safety member according to a first exemplary embodiment of the present invention.
Figure 4:
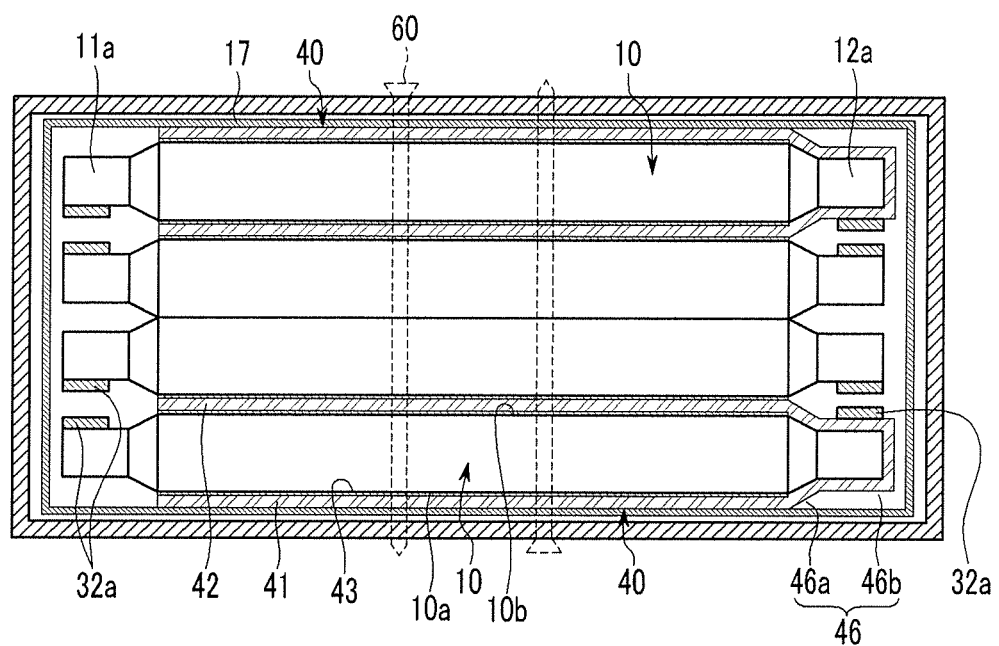
FIG. 4 is a plan view of the electrode assembly and the safety member of FIG. 3 coupled to each other.

FIG. 3 is an exploded perspective view of an electrode assembly and a safety member according to a first exemplary embodiment of the present invention. FIG. 4 is a plan view showing a state in which members shown in FIG. 3 are coupled with each other.

The safety member 40 is installed to fit the electrode assemblies 10 which are located at both side ends of the electrode assemblies 10, i.e., the outer peripheral electrode assemblies. The safety member 40 includes a first side plate 41 attached to a first planar surface 10a facing the exterior of the electrode assembly 10 and a second side plate 42 attached to a second planar surface 10b facing a direction opposite to the first planar surface 10a, and a connector 46 connecting the first side plate 41 and the second side plate 42 with each other.

In this disclosure, the planar surface means a planar surface other than curved portions of the top and bottom on the outer periphery of the electrode assembly 10.

The first side plate 41, the second side plate 42, and the connector 46 are formed by a metal plate having conductivity such as copper, stainless steel, or the like. The first side plate 41, the second side plate 42, and the connector 46 according to the exemplary embodiment are formed by bending one sheet which is integrally formed.

The connector 46 has a sheet shape which is bent twice to have opposing surfaces. Therefore, the first side plate 41 and the second side plate 42 extend substantially parallel to each other. The connector 46 connects the first side plate 41 and the second side plate 42 with each other at the side ends of the first side plate 41 and the second side plate 42.

The connector 46 is attached to the first side plate 41 and the second side plate 42 and includes a guide plate 46a which is inclined towards the electrode assembly 10 and a connection plate 46b of which both ends are bent and link with the guide plate 46a. The connection plate 46b connects the first side plate 41 and the second side plate 42 with each other through the guide plate 46a. As shown in FIG. 4, the negative uncoated area 12a is inserted into the connection plate 46b. The connection plate 46b is welded to the negative uncoated area 12a to be electrically connected with the negative uncoated area 12a and supports the negative uncoated area 12a to prevent the negative uncoated area 12a from being adversely affected by external shock or vibration. In addition, the current collecting member 32 may be welded to the negative uncoated area 12a through the connection plate 46b. Alternatively, an incision may be formed between the connection plate 46b and the current collecting member 32 which may be attached to the negative uncoated area 12a by direct welding.

When the electrode assembly 10 is dislodged or moved by external shock or vibration, the contact between the uncoated areas 11a and 12a and the current collecting member 32 can deteriorate. However, as described in the exemplary embodiment, when the safety member 40 engages and supports the electrode assembly 10, it is possible to prevent the contact between the uncoated areas 11a and 12a and the electrode current collecting member 32 from being significantly deteriorated by external shock or vibration.

In one embodiment, an insulation film 43 is attached onto each of surfaces of the first side plate 41 and the second side plate 42 which contact the electrode assembly 10. The insulation film 43 is made of a polymer and serves to prevent the positive electrode of the electrode assembly 10 and the safety member 40 from being electrically connected with each other.

As shown in FIG. 4, if a conductive foreign material 60 such as a nail or a screw penetrates from the outside of the rechargeable battery 100 without the safety member due to shock or accident, the positive electrode and the negative electrode may short-circuit each other due to the conductive foreign material 60, causing excessive heat to be generated in the rechargeable battery 100, which may result in explosion or the battery catching fire. However, as described in the exemplary embodiment, when the safety member is installed, the first side plate 41 or the second side plate 42 and the case 34 short circuit each other, thereby safely discharging charged current.

As such, according to the exemplary embodiment, when foreign materials penetrate to cause a short-circuit, current is discharged to remove an explosion risk, thereby improving the safety of the rechargeable battery 100.

According to the exemplary embodiment, the safety member 40 is simply installed between the electrode assemblies 10 by engaging the electrode assembly 10 in the safety member 40, such that the safety member 40 may support the electrode assembly 10.

Figure 5:
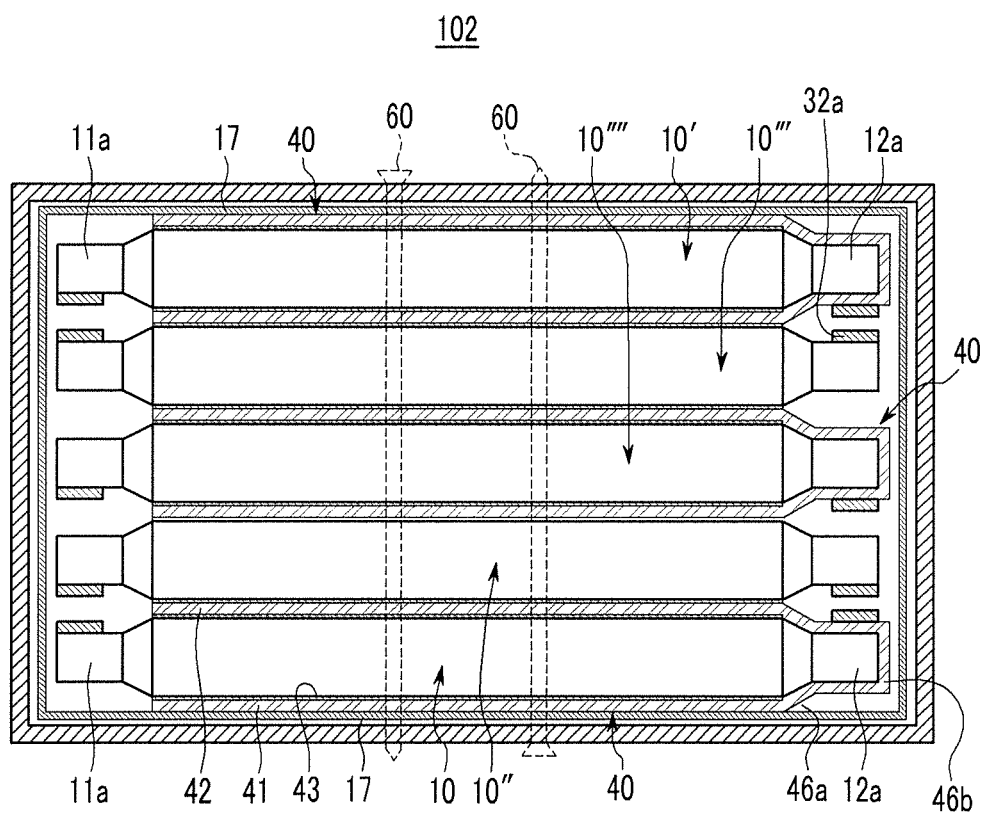
FIG. 5 is a cross-sectional view of a rechargeable battery according to an alternate embodiment of the present invention.

FIG. 5 is a cross-sectional view of a rechargeable battery according to a modified example of the first exemplary embodiment of the present invention.

Five electrode assemblies are installed in the rechargeable battery 102 according to the exemplary embodiment. With five electrode assemblies 10, 10', 10", 10''', and 10'''', the safety member 40 is installed in the electrode assemblies 10 and 10' which are located at the outermost sides (i.e., the peripheral electrode assemblies) and in the center electrode assembly 10''', and the safety member 40 is not installed in the electrode assemblies 10" and 10''' which are adjacent to the electrode assemblies 10 and 10'. As a result, if conductive foreign material penetrates from the outside, the safety member 40 electrically connected with the negative electrode 12 and the case 34 electrically connected with the positive terminal 21 short-circuit each other so as to stably discharge current.

Further, if six electrode assemblies are installed in the same manner as above, the safety member 40 is installed in the electrode assemblies which are located at the outermost sides and in the center two electrode assembly, but the safety member 40 is not installed in the electrode assemblies between the center and periphery electrode assemblies on either side.

Figure 6:
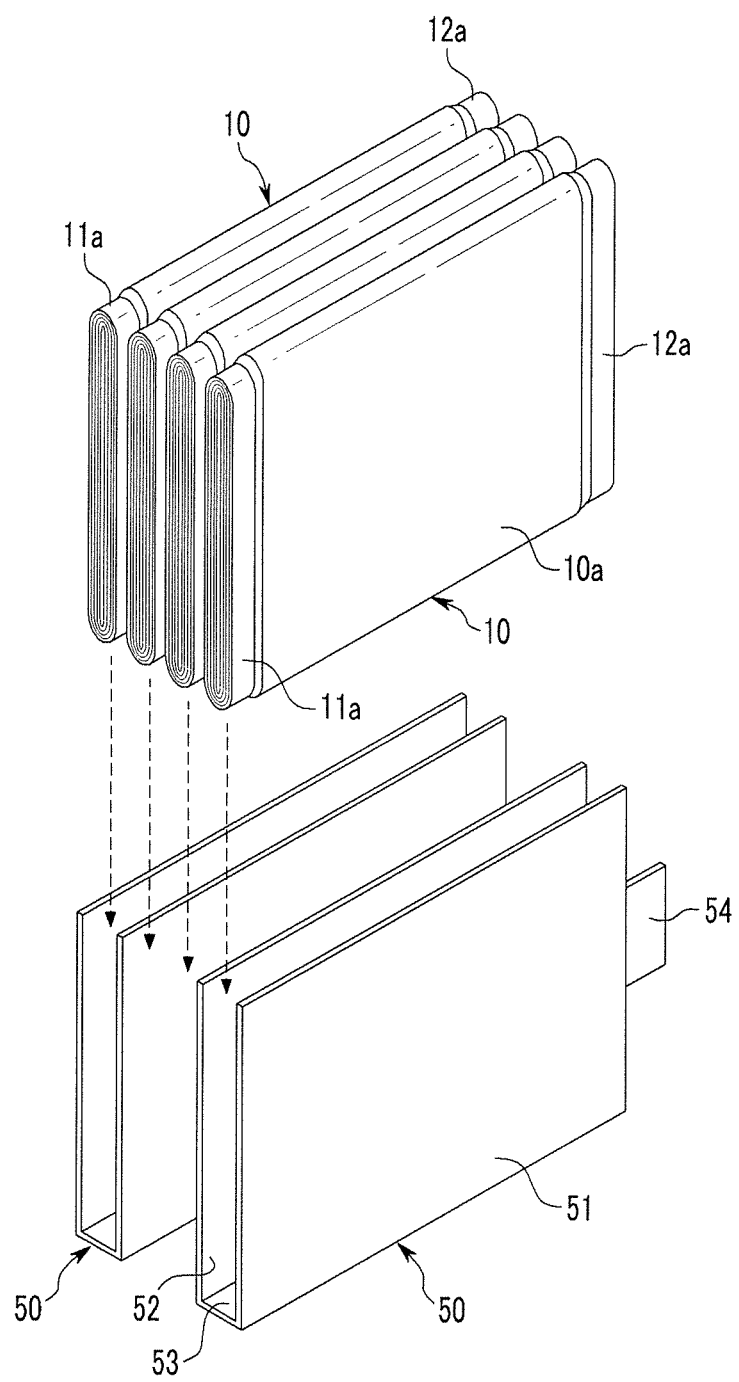
FIG. 6 is an exploded perspective view of a safety member and an electrode assembly according to a second exemplary embodiment of the present invention.
Figure 7:
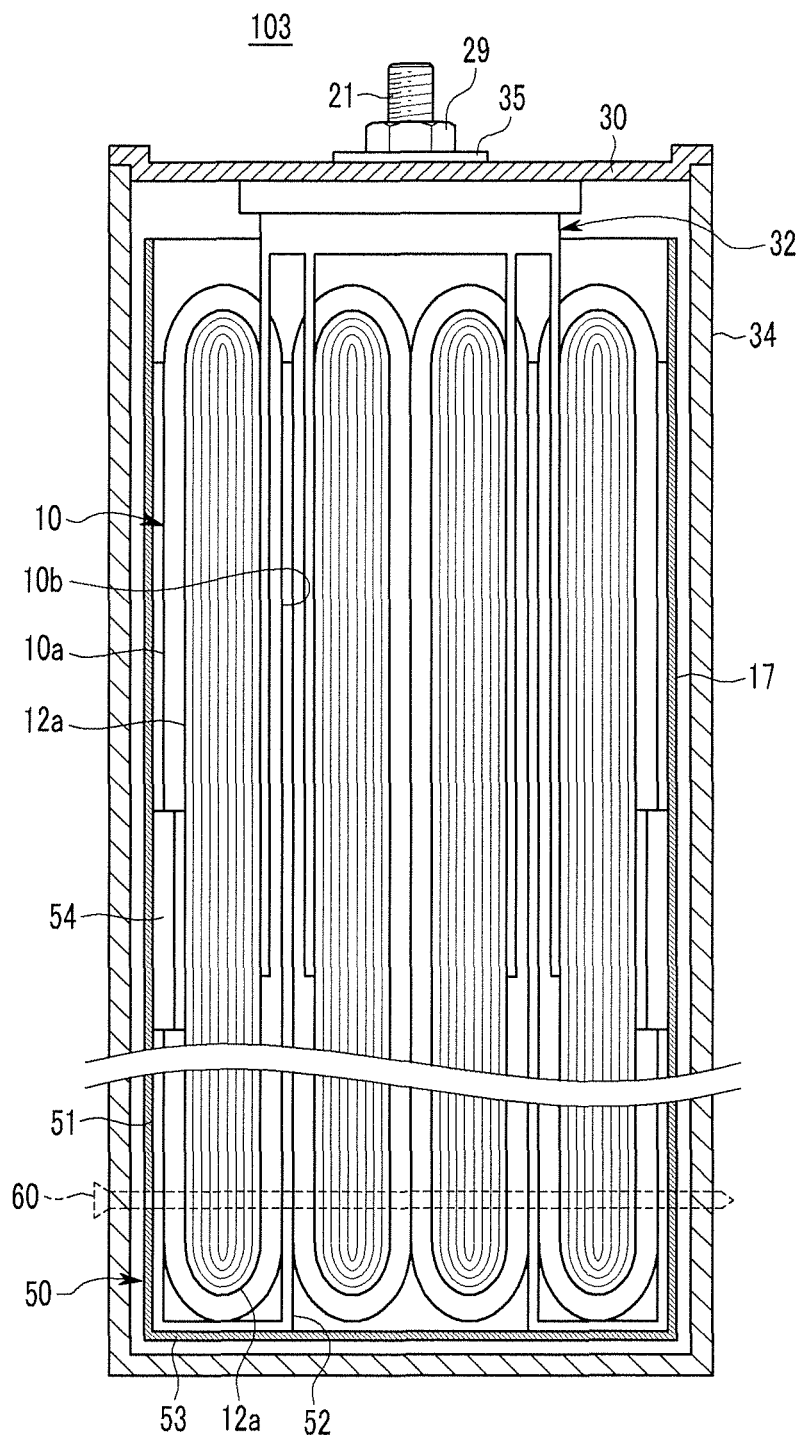
FIG. 7 is a cross-sectional view showing a rechargeable battery according to a second exemplary embodiment of the present invention.

FIG. 6 is an exploded perspective view showing a safety member and an electrode assembly according to a second exemplary embodiment of the present invention and FIG. 7 is a cross-sectional view showing a rechargeable battery according to a second exemplary embodiment of the present invention.

Referring to FIGS. 6 and 7, the rechargeable battery 103 according to the exemplary embodiment has substantially the same structure as the rechargeable battery according to the first exemplary embodiment except for the configuration of the safety member. Therefore, a description of the same structure will not be repeated.

The rechargeable battery 103 includes a case 34, four electrode assemblies installed in the case 34, and two safety members 50 engaging the electrode assemblies 10.

The case 34 is electrically connected with the positive terminal 21. Four electrode assemblies 10 are superimposed on each other in the case 34 and the safety member 50 engages the two electrode assemblies 10 which are located at the outside (i.e., the peripheral electrode assemblies). The safety member 50 includes a first side plate 51 which contacts a first planar surface 10a facing the outside of the electrode assembly 10 and a second side plate 52 which contacts a second planar surface 10b facing a direction opposite to the first planar surface 10a, and a connector 53 which connects the first side plate 51 and the second side plate 52 with each other.

The connector 53 has a flat plate shape and the first side plate 51 and the second side plate 52 are bent at the connector 53 and extend substantially in parallel to each other. The first side plate 51 and the second side plate 52, and the connector 53 are formed by bending the first side plate 51 and the second side plate 52 of a single plate. The connector 53 is formed on the bottom of the first side plate 51 and the second side plate 52.

A connection tab 54 which may be attached to the negative uncoated area 12a by welding protrudes from the side end of the first side plate 51. In the exemplary embodiment, the connection tab 54 protrudes from the first side plate 51, but the present invention is not limited thereto and the connection tab 54 may protrude, for example, from the side end of the first side plate 51 or the second side plate 52.

As such, according to the exemplary embodiment, since the bottom of the first side plate 51 and the second side plate 52 are fixed by the connector 53, it is possible to easily install the safety member 50 by engaging the electrode assembly 10 in the safety member 50. Further, since the first side plate 51 and the second side plate 52 are electrically connected with the negative electrode by one connection tab, it is possible to more easily install the safety member 50.

When a conductive material such as a nail, or the like penetrates from the outside, the safety member 50 allows the safety member 50 and the case 34 to short-circuit each other to prevent the rechargeable battery from being catching fire or exploding.

Figure 8:
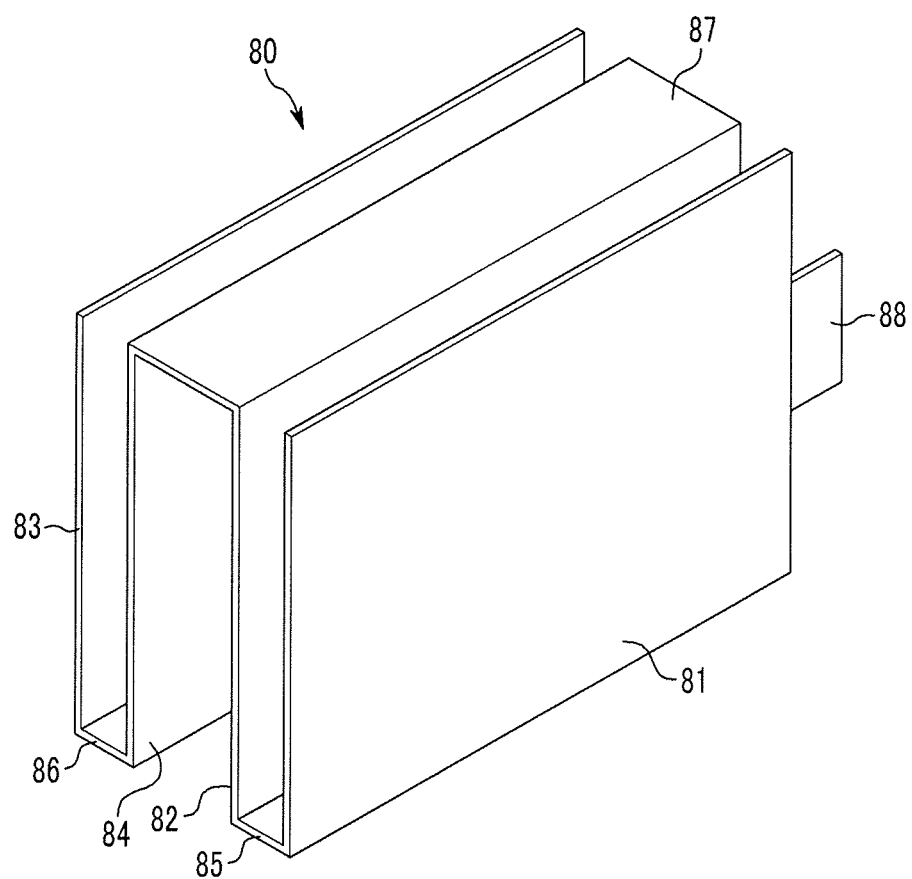
FIG. 8 is a perspective view showing a safety member of a rechargeable battery according to a third exemplary embodiment of the present invention.
Figure 9:
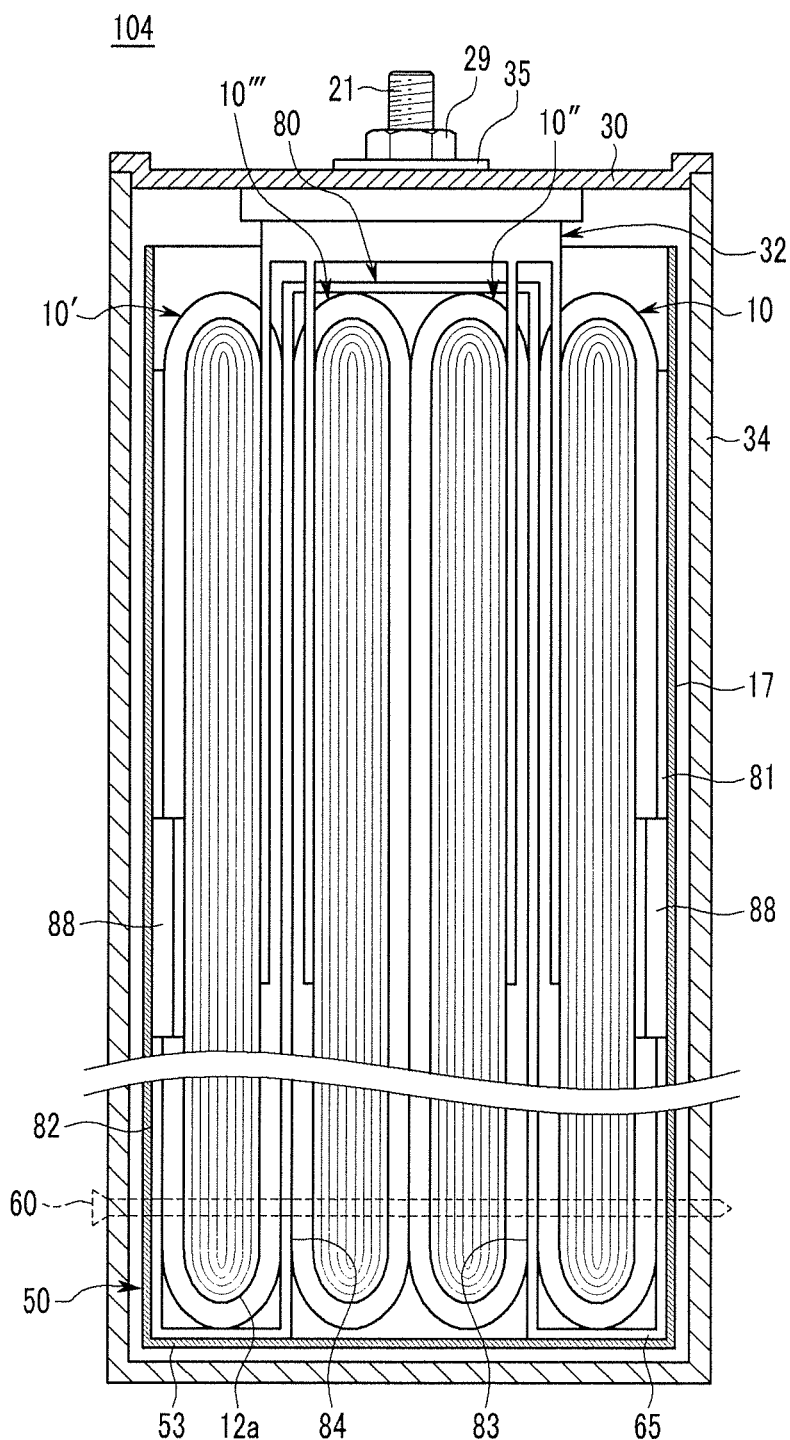
FIG. 9 is a cross-sectional view of a rechargeable battery according to a third exemplary embodiment of the present invention.

FIG. 8 is a perspective view showing a safety member of a rechargeable battery according to a third exemplary embodiment of the present invention and FIG. 9 is a cross-sectional view showing a rechargeable battery according to a third exemplary embodiment of the present invention.

Referring to FIGS. 8 and 9, the rechargeable battery 104 according to the exemplary embodiment includes a case 34, four electrode assemblies 10, 10', 10'', and 10''' installed in the case 34, and a safety member 80 which is in contact with the electrode assemblies 10, 10', 10'', and 10'''. The case 34 is electrically connected with the positive terminal 21.

The safety member 80 includes a first side plate 81 which contacts a planar surface facing the outside of the electrode assembly 10 that is located at one periphery and a second side plate 82 which contacts a planar surface facing a direction opposite to the planar surface that contacts the first side plate 81, and a first connector 85 which is bent on the bottom of the first side plate 81 and the second side plate 82.

Further, the safety member 80 includes a third side plate 83 which contacts a planar surface facing the outside of the electrode assembly 10' which is located at the other periphery and a fourth side plate 84 which contacts a planar surface facing a direction opposite to the planar surface where the third side plate 83 is installed, and a second connector 86 which is bent on the bottom of the third side plate 83 and the fourth side plate 84.

Further, the safety member 80 includes a third connector 87 which is bent on the top of the second side plate 82 and the fourth side plate 84. As such, the ends of the side plates 81, 82, 83, and 84 are alternately connected with each other by the connectors 85, 86, and 87. The safety member 80 has a plate shape. A single flat plate is bent in zigzag to form the side plates 81, 82, 83, and 84 and the connectors 85, 86, and 87.

One electrode assembly 10 which is located at one edge is inserted between the first side plate 81 and the second side plate 82 and one electrode assembly 10' which is located at the other edge is inserted between the third side plate 83 and the fourth side plate 84. Further, two electrode assemblies 10'' and 10''' which are located at the center are inserted between the second side plate 82 and the fourth side plate 84.

Connection tabs 88 which may be attached by welding to the negative uncoated areas 12a of the electrode assemblies 10 and 10' that contact the side plates 81 and 83 protrude on the first side plate 81 and the third side plate 83. The connection tab 88 serves to electrically connect the safety 80 and the electrode assembly 10 with each other. Therefore, the connection tab 88 is welded to the negative uncoated area 12a.

As such, according to the exemplary embodiment, since the safety member 80 is bent in zigzag, the plurality of electrode assemblies 10, 10', 10'', and 10''' may be stably supported by using one safety member 80. Further, if conductive foreign material 60 such as the nail penetrates on both surfaces of the rechargeable battery 104, the safety member 80 and the case 34 short-circuit each other, thereby rapidly discharging current without firing.

Figure 10:
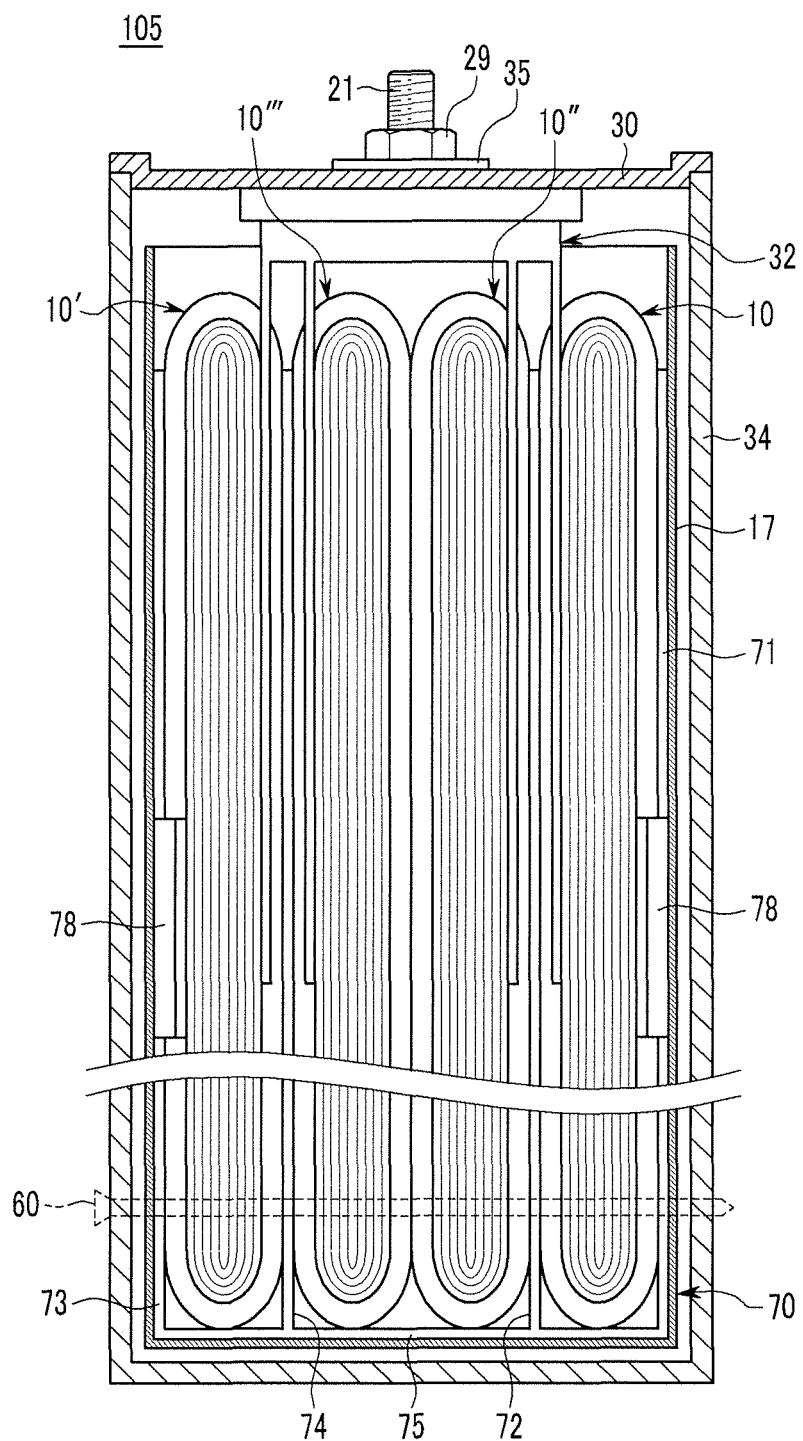
FIG. 10 is a cross-sectional view showing a rechargeable battery according to a fourth exemplary embodiment of the present invention.

FIG. 10 is a cross-sectional view showing a rechargeable battery according to a fourth exemplary embodiment of the present invention.

Referring to FIG. 10, the rechargeable battery 105 according to the exemplary embodiment includes a case 34, a plurality of electrode assemblies 10, 10', 10'', and 10''' installed in the case 34, and a safety member 70 which is in contact with the electrode assemblies 10, 10', 10'', and 10'''. In this case, the case 34 is electrically connected with the positive terminal 21.

The safety member 70 includes a plate-shaped connector 75 and a plurality of side plates 71 and 72 which protrude on the connector 75.

The connector 75 has a flat plate shape, and extends in an arrangement direction of the electrode assemblies 10, 10', 10'', and 10''' and is positioned on the bottom of the electrode assemblies 10, 10', 10'', and 10'''. A first side plate 71 is in contact with a planar surface facing the outside of a first peripheral electrode assembly 10 and a second side plate 72 is in contact with a planar surface facing a direction opposite to the planar surface which contacts the first side plate 71. Further, a third side plate 73 is in contact with a planar surface facing the outside of a second peripheral electrode assembly 10', and a fourth side plate 74 is in contact with a planar surface facing a direction opposite to the planar surface where the third side plate 73 is installed. The plates 71, 72, 73 and 74 protrude from the connector 75.

An electrode assembly 10 which is located at a first periphery is inserted between the first side plate 71 and the second side plate 72 and an electrode assembly 10' which is located at a second periphery is inserted between the third side plate 73 and the fourth side plate 74. In addition, two electrode assemblies 10'' and 10''' which are located at the center are inserted between the second side plate 72 and the fourth side plate 74.

As such, according to the exemplary embodiment, the electrode assemblies 10, 10', 10'', and 10''' may be stably supported by using one safety member 70 having the plurality of side plates 71, 72, 73, and 74 which protrude from the connector 75. Further, if a conductive foreign material 60 such as a nail penetrates both surfaces of the rechargeable battery 105, the safety member 70 and the case 34 can short-circuit each other to discharge current, thereby preventing the battery catching fire or exploding.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 101, 102, 103, 104, 105: Rechargeable battery | |
| 10: Electrode assembly | 10a: First planar surface |
| 10b: Second planar surface | 11: Positive electrode |
| 12: Negative electrode | 11a: Positive uncoated area |
| 12a: Negative uncoated area | 13: Separator |
| 17: Insulating encapsulation | 20: Cap assembly |
| 21: Positive terminal | 22: Negative terminal |
| 21a, 22a: Terminal flange | 24: Washer |
| 25: Gasket | 26: Insulation member |
| 27: Electrolyte injection hole | 29: Nut |
| 30: Cap plate | 32: Lead member |
| 34: Case | 38: Sealing plug |
| 39: Vent member | 39a: Notch |
| 40, 50, 70, 80: Safety member | 41, 51, 71, 81: First side plate |
| 42, 52, 72, 82: Second side plate | 43: Insulation film |
| 46, 53, 75: Connector | 46a: Guide plate |
| 46b: Connection plate | 54, 88: Connection tab |
| 73, 83: Third side plate | 74, 84: Fourth side plate |
| 85: First connector | 86: Second connector |
| 87: Third connector | |

What is claimed is:

1. A rechargeable battery comprising:
a plurality of electrode assemblies each having a first planar surface and a second planar surface substantially opposite to the first planar surface;
a current collecting member electrically connected to the electrode assemblies;
a case housing the electrode assemblies; and
a safety member comprising a first side plate including an insulation film, wherein the insulation film directly contacts the first planar surface of a first electrode assembly of the plurality of electrode assemblies and is spaced from the current collecting member, wherein the first electrode assembly is located at a periphery of the electrode assemblies, a second side plate that contacts the second planar surface of the first electrode assembly, and a connector electrically connecting the first side plate and the second side plate to each other, wherein the first side plate and the second side plate comprise a conductive material.

2. The rechargeable battery of claim 1, wherein the connector is generally U-shaped to have opposing surfaces.

3. The rechargeable battery of claim 1, wherein each of the electrode assemblies comprises a first electrode having an uncoated area on which a current collecting member is exposed and wherein the connector is welded to the uncoated area.

4. The rechargeable battery of claim 3, wherein the first electrode is a negative electrode.

5. The rechargeable battery of claim 1, wherein each of the electrode assemblies comprises a second electrode and wherein the case is electrically coupled to the second electrode.

6. The rechargeable battery of claim 5, further comprising a cap plate coupled to the case, an electrode terminal protruding outwardly from the cap plate and being electrically coupled to the second electrode, and a connection member located on the electrode terminal and contacting the cap plate.

7. The rechargeable battery of claim 1, wherein the first side plate and the second side plate have an insulation film thereon.

8. The rechargeable battery of claim 1, wherein the safety member engages two electrode assemblies of the plurality of electrode assemblies, each of the two electrode assemblies being located at a periphery of the plurality of electrode assemblies.

9. The rechargeable battery of claim 8, wherein each of the two electrode assemblies that the safety member engages is located adjacent to an electrode assembly that the safety member does not engage.

10. The rechargeable battery of claim 1, wherein the connector is connected to one end edge of each of the first side plate and the second side plate.

11. The rechargeable battery of claim 1, wherein the connector is connected to the top edge or the bottom edge of each of the first side plate and the second side plate.

12. The rechargeable battery of claim 11, wherein the first side plate or the second side plate further comprises a connection protrusion electrically connected to the electrode assembly.

13. The rechargeable battery of claim 1, wherein the safety member further comprises a third side plate and a fourth side plate that contact the first planar surface and the second planar surface, respectively, of a second electrode assembly of the electrode assmeblies located at a periphery of the electrode assemblies, and a second connector connecting the third side plate and the fourth side plate to each other, wherein the first side plate and the fourth side plate are located at opposing peripheries of the electrode assemblies, and a third connector connecting the second side plate and the third side plate to each other.

14. The rechargeable battery of claim 1, wherein the safety member is a single sheet of material.

* * * * *